United States Patent
Gaerke et al.

(10) Patent No.: US 10,763,721 B2
(45) Date of Patent: Sep. 1, 2020

(54) ELECTRIC MACHINE WITH INTEGRATED AIRFLOW INDUCER

(71) Applicant: Siemens Industry, Inc., Alpharetta, GA (US)

(72) Inventors: Tyler Gaerke, Cincinnati, OH (US); Daniel Lasorso, Norwood, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 346 days.

(21) Appl. No.: 15/935,369

(22) Filed: Mar. 26, 2018

(65) Prior Publication Data
US 2018/0287453 A1 Oct. 4, 2018

Related U.S. Application Data

(60) Provisional application No. 62/479,564, filed on Mar. 31, 2017.

(51) Int. Cl.
| | |
|---|---|
| *H02K 9/04* | (2006.01) |
| *H02K 15/00* | (2006.01) |
| *H02K 5/20* | (2006.01) |
| *H02K 5/18* | (2006.01) |

(52) U.S. Cl.
CPC .............. *H02K 5/20* (2013.01); *H02K 5/18* (2013.01); *H02K 9/04* (2013.01)

(58) Field of Classification Search
CPC .. H02K 5/20; H02K 9/06; H02K 5/18; H02K 9/04; H02K 9/14; H02K 2213/03
USPC .................................................. 310/52–64, 89
See application file for complete search history.

(56) References Cited

U.S. PATENT DOCUMENTS

| | | | | |
|---|---|---|---|---|
| 4,811,820 A | * | 3/1989 | Rossi ................... | H02K 7/1025 188/161 |
| 5,743,721 A | * | 4/1998 | Graham ................ | F04D 25/082 310/58 |
| 2003/0117028 A1 | * | 6/2003 | Agnes .................... | H02K 29/12 310/68 R |
| 2007/0273220 A1 | * | 11/2007 | Koyama .................. | H02K 9/06 310/58 |

* cited by examiner

*Primary Examiner* — Naishadh N Desai (57) ABSTRACT

An electric machine comprises a frame, a cooling fan disposed in a fan housing and an integrated airflow inducer in a shape of a partial cone. The partial cone defines a skirt disposed as a differential sized ring with a larger entrance and a smaller exit around the frame of the electric machine at a boundary between the frame and the fan housing including a rotating fan to cool the electric machine. The integrated airflow inducer includes an inducer inlet and an inducer outlet. The integrated airflow inducer is configured to increase an airflow across the frame of the electric machine as the rotating fan develops a higher pressure at the inducer outlet than the inducer inlet of the integrated airflow inducer so that the integrated airflow inducer takes advantage of the high pressure to draw in air from a low pressure at the inducer inlet so that the electric machine operates at a lower temperature than without the integrated airflow inducer.

18 Claims, 5 Drawing Sheets

FIG. 7
View A-A

FIG. 8

ELECTRIC MACHINE WITH INTEGRATED AIRFLOW INDUCER

CROSS REFERENCE TO RELATED APPLICATIONS

This application claims the benefit of U.S. Provisional Application Ser. No. 62/479,564 entitled "ELECTRODYNAMIC MACHINE WITH INTEGRATED AIRFLOW INDUCER," filed on Mar. 31, 2017, the contents of which are hereby incorporated by reference herein in their entirety.

BACKGROUND

1. Field

Aspects of the present invention generally relate to rotating electrical machines, generally referred to as electric machines, such as electric motors or generators, and in particular to cooling of electric machines.

2. Description of the Related Art

As a result of various magnetic, electric and other losses in an electric machine such as a motor or a generator, a significant level of heat is generated which needs to be removed from the electric machine. The maximum permissible heating is determined by the heat resistance of the materials such as insulation, solder, and lubricant used in the machine. One method of heat removal is to cool the heated parts of the electric machine with a circulating intermediary substance that may be air, various gases (hydrogen, carbon dioxide, helium), or a liquid (transformer oil, water, chlorinated biphenyl).

Electric machine cooling, of necessity, is typically done with by using a fan to create air pressure to induce airflow within the electric machine. The cavity or housing where the fan resides and where the air pressure is developed will determine the direction of the airflow. As the power of the machine is increased additional cooling is needed. The required additional cooling has been addressed by increasing the amount of airflow which requires more fan power and decreases the machine losses. The machine size and active materials have been increased to reduce machine losses, which in turn increases the capital cost or investment. An electric machine could have costly auxiliary cooling components mounted which increases complexity, decreases the reliability and adds maintenance cost.

Therefore, there is a need for efficiently removing heat from electric machines while decreasing the complexity of heat removal solutions.

SUMMARY

Briefly described, aspects of the present invention relate to cooling of an electric machine by using a fan to create air pressure to induce airflow within the electric machine. The cavity or housing where the fan resides and where the air pressure is developed will determine the direction of the airflow. The air pressure that is already developed by the standard fan(s) leaves the cavity or housing of the electric machine at higher pressure than atmospheric pressure. In accordance with an exemplary embodiment, an integrated airflow inducer is provided that utilizes the high velocity and dynamic pressure of air exiting the fan cavity to create a negative pressure at the inducer inlet, causing air to be drawn into the integrated airflow inducer and guided toward the cooling fins, thus increasing the heat rejection capabilities of a frame. Such an integrated airflow inducer will decrease machine size and active materials, increase machine efficiency, eliminate the need for costly auxiliary mounted cooling devices and reduce the capital cost of the machine.

In accordance with one illustrative embodiment of the present invention, an electric machine comprises a frame that defines a housing of the electric machine. The frame includes a top edge and a plurality of cooling fins along a length of the housing. The electric machine further comprises a cooling fan disposed in a fan housing. The fan housing includes a bottom edge. The fan housing is mounted on the top edge of the frame such that a fan cavity is formed between the bottom edge of the fan housing and the plurality of cooling fins of the frame. The electric machine further comprises an integrated airflow inducer in a shape of a partial cone that defines a skirt disposed as a ring around the frame at a boundary between the frame and the fan housing. The integrated airflow inducer includes an inducer inlet and an inducer outlet. The integrated airflow inducer is configured to increase an airflow across the frame of the electric machine so that the electric machine operates at a lower temperature than without the integrated airflow inducer.

In accordance with another illustrative embodiment of the present invention, an integrated airflow inducer comprises a partial cone that defines a skirt disposed as a differential sized ring with a larger entrance and a smaller exit around a frame of an electric machine at a boundary between the frame and a fan housing including a rotating fan to cool the electric machine. The integrated airflow inducer includes an inducer inlet and an inducer outlet. The integrated airflow inducer is configured to increase an airflow across the frame of the electric machine as the rotating fan develops a higher pressure at the inducer outlet than the inducer inlet of the integrated airflow inducer so that the integrated airflow inducer takes advantage of the high pressure to draw in air from a low pressure at the inducer inlet so that the electric machine operates at a lower temperature than without the integrated airflow inducer.

DETAILED DESCRIPTION

To facilitate an understanding of embodiments, principles, and features of the present invention, they are explained hereinafter with reference to implementation in illustrative embodiments. In particular, they are described in the context of an integrated airflow inducer installed on an electric machine frame to cool an electric machine. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
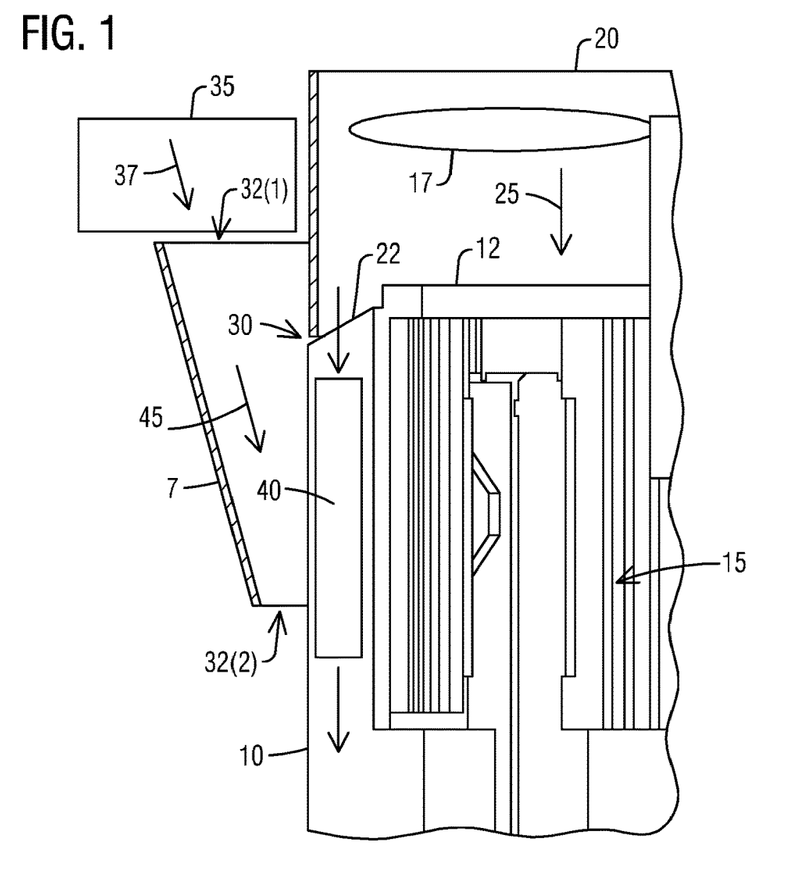
FIG. 1 illustrates a partially cross-sectional view of an electric machine comprising an integrated airflow inducer in accordance with an exemplary embodiment of the present invention.

Consistent with one embodiment of the present invention, FIG. 1 represents a representation of a partially cross-sectional view of an electric machine 5 comprising an integrated airflow inducer 7 in accordance with an exemplary embodiment of the present invention. The electric machine 5 comprises a frame 10 that defines a housing of the electric machine 5. The frame 10 includes a top edge 12 and a plurality of cooling fins 15 along a length of the housing. The electric machine 5 further comprises a cooling fan 17 disposed in a fan housing 20. The fan housing 20 includes a bottom edge 22. The fan housing 20 is mounted on the top edge 12 of the frame 10 such that a fan cavity 25 is formed between the bottom edge 22 of the fan housing 20 and the plurality of cooling fins 15 of the frame 10. The fan housing 20 rests on the plurality of cooling fins 15 such that a gap is created between the frame 10 internal wall and a wall of the fan housing 20. The gap defines the fan cavity 25.

The electric machine 5 further comprises the integrated airflow inducer 7 in a shape of a partial cone that defines a skirt disposed as a ring around the frame 10 at a boundary 30 between the frame 10 and the fan housing 20. The integrated airflow inducer 7 includes an inducer inlet 32(1) and an inducer outlet 32(2). The integrated airflow inducer 7 is configured to increase an airflow across the frame 10 of the electric machine 5 so that the electric machine 5 operates at a lower temperature than possible without the integrated airflow inducer 7.

In operation, the integrated airflow inducer 7 utilizes a high velocity and a dynamic pressure of an air exiting the fan cavity 25 to create a negative or a low pressure region 35 at the inducer inlet 32(1) for causing an ambient air 37 to be drawn into the integrated airflow inducer 7 and guided toward the plurality of cooling fins 15 of the frame 10, thus increasing heat rejection capabilities of the frame 10. The integrated airflow inducer 7 is arranged such that due to an air pressure that is created by the cooling fan 17, the housing of the electric machine 5 is at a higher pressure as shown by a high pressure region 40 than an atmospheric pressure causing the ambient air 37 being drawn into the inducer inlet 32(1) and guided toward the plurality of cooling fins 15 of the frame 10. An airflow is created by rotating the cooling fan 17 within the fan housing 20 to create an air pressure differential wherein while the cooling fan 17 requires a power source for movement the integrated airflow inducer 7 is passive and doesn't require an additional power. An additional airflow 45 is thus created by the presence of the integrated airflow inducer 7 towards the plurality of cooling fins 15 along the length of the housing of the electric machine 5.

Figure 2:
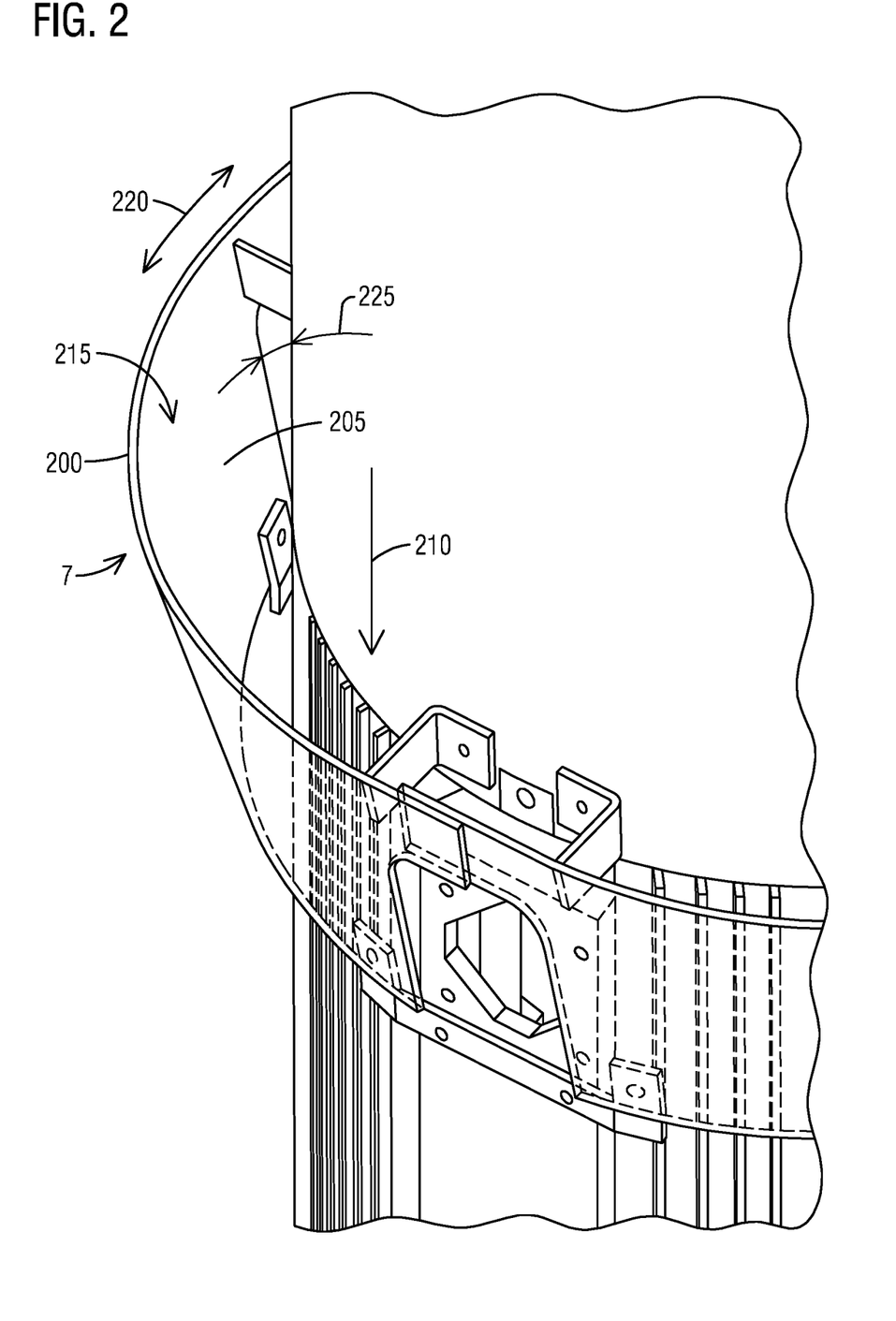
FIG. 2 illustrates schematically a partial elevational view of the integrated airflow inducer in accordance with embodiments disclosed herein.

Referring to FIG. 2, it illustrates schematically a partial elevational view of the integrated airflow inducer 7 of FIG. 1 in accordance with embodiments disclosed herein. The integrated airflow inducer 7 is in a shape of a partial cone 200 that defines a skirt 205 disposed as a ring around a moving airflow path 210. In one embodiment, the integrated airflow inducer 7 comprises the shape of the partial cone 200 with straight surfaces 215 such that the ring is in a form of an arc. The integrated airflow inducer 7 comprises a length 220 of the arc that is tuned to optimize performance such that the length of the arc and an angle 225 of the straight surfaces 215 of the partial cone 200 are to be modified to optimize performance. The integrated airflow inducer 7 may be made of a metal, a plastic and/or a composite material.

Figure 3:
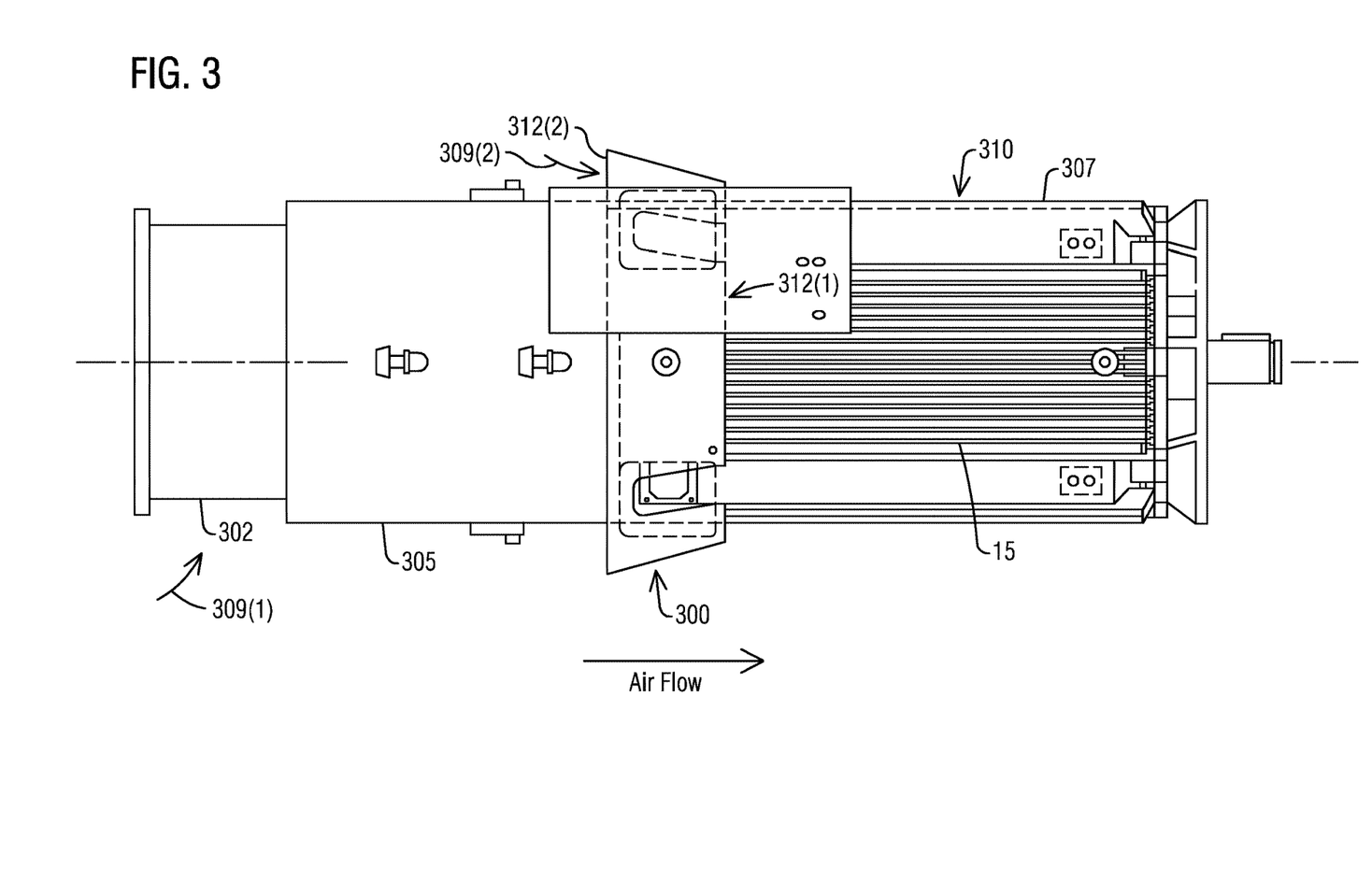
FIG. 3 illustrates a perspective view of an integrated airflow inducer mounted on a fan housing and a frame of an electric machine in accordance with an exemplary embodiment of the present invention.

Turning now to FIG. 3, it illustrates a perspective view of an integrated airflow inducer 300 mounted on a fan housing 305 and a frame 307 with cooling fins of an electric machine 310 in accordance with an exemplary embodiment of the present invention. An air inlet 302 is provided on a top of the fan housing 305 for a primary air intake 309(1). The integrated airflow inducer 300 provides an additional airflow intake 309(2) as described next.

A cooling fan (not seen) develops a higher pressure at an inducer outlet 312(1) than an inducer inlet 312(2) of the integrated airflow inducer 300 so that the integrated airflow inducer 300 takes advantage of the high pressure to draw in air from a low pressure at the inducer inlet 312(2). Cooling of the electric machine 310 may be done by using a fan to create air pressure to induce an airflow within the electric machine 310. A cavity or housing where the fan resides and where the air pressure is developed may determine the direction of the airflow. The air pressure that is already developed by the fan leaves the cavity or housing of the electric machine 310 at a higher pressure than an atmospheric pressure. In accordance with an exemplary embodiment, the integrated airflow inducer 300 is provided that utilizes the high velocity and dynamic pressure of air exiting the fan cavity to create a negative pressure at the inducer inlet 312(1), causing air to be drawn into the integrated airflow inducer 300 and guided toward the cooling fins of the frame 307, thus increasing the heat rejection capabilities of the frame 307. Such an integrated airflow inducer 300 may decrease machine size and active materials, increase machine efficiency, eliminate the need for costly auxiliary mounted cooling devices and reduce the capital cost of the electric machine 310.

Figure 4:
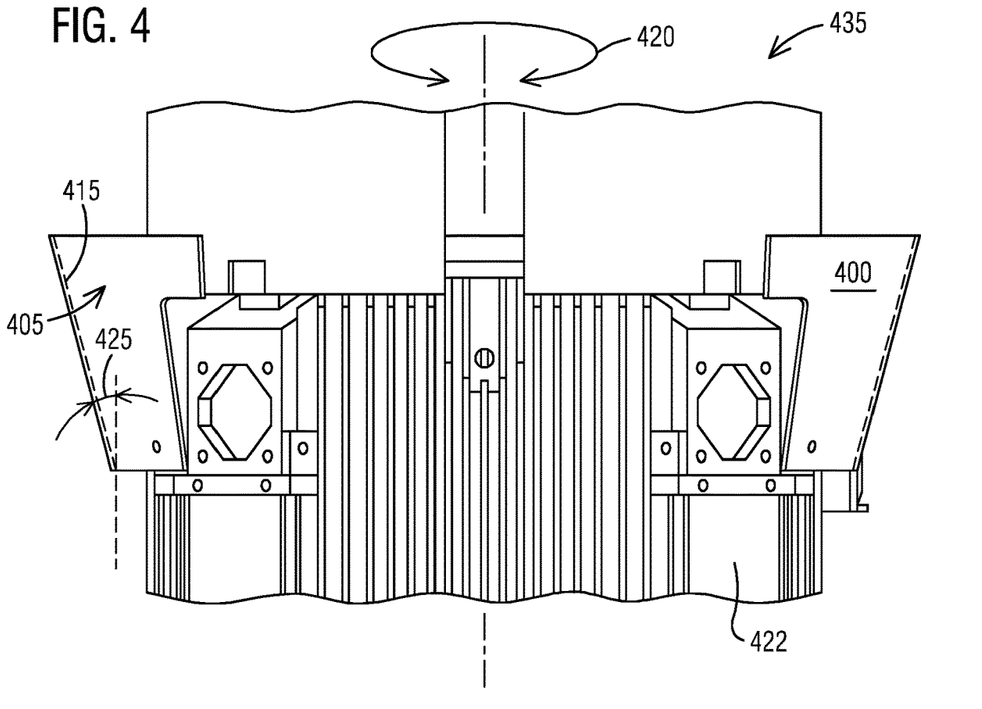
FIG. 4 illustrates schematically a partial cut-away view of an integrated airflow inducer in accordance with an exemplary embodiment of the present invention.

FIG. 4 illustrates schematically a partial cut-away view of an integrated airflow inducer 400 in accordance with an exemplary embodiment of the present invention. In one embodiment, the integrated airflow inducer 400 comprises a shape of a partial cone 405 with straight surfaces 415 such that a ring is in a form of an arc. The integrated airflow inducer 400 comprises a length 420 of the arc that is tuned to optimize performance such that the length of the arc and an angle 425 of the straight surfaces 415 of the partial cone 405 are to be modified to optimize performance. In this way, the integrated airflow inducer 400 has a customizable shape to optimize induced air flow.

The length 420 of the arc may be selected to be all around a circumference of a diameter of a frame 422 of an electric machine 435. Alternatively, a portion of the circumference of the diameter of the frame 422 may be covered by the integrated airflow inducer 400. This portion may me contiguous or broken in sections. Examples of the angle 425 may be in a first range of 0 to 30 degrees relative to a central axis 430 of the electric machine 435. Alternatively, the angle 425 may be in a second range of 20 to 45 degrees. Preferably the angle 425 may be between 15 to 35 degrees.

Figure 5:
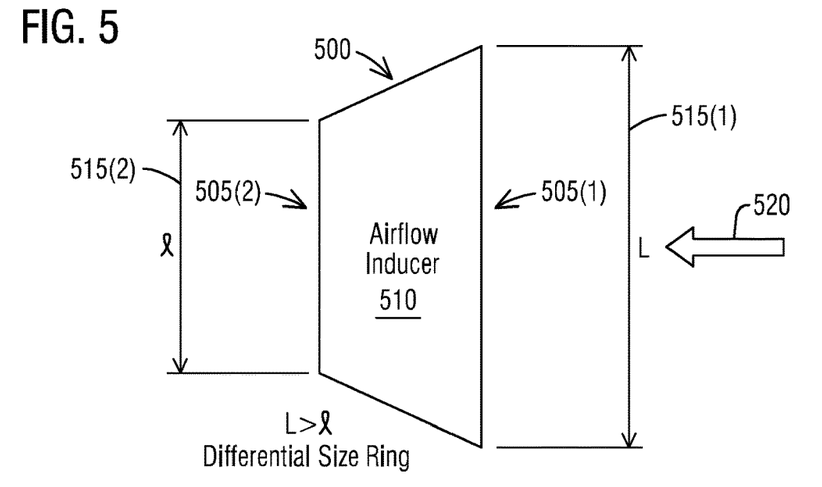
FIG. 5 illustrates schematically a side view of an integrated airflow inducer in accordance with an exemplary embodiment of the present invention.

As seen in FIG. 5, it illustrates schematically a side view of an integrated airflow inducer 500 with a differential diameter at two ends 505(1-2) of it in accordance with an exemplary embodiment of the present invention. A ring 510 in a form of an arc is formed by the integrated airflow inducer 500. The ring 510 has a larger diameter (L) 515(1) on an entrance side for a scavenge air 520 to enter and a smaller diameter (l) 515(2) on an exit side such that the entrance side has a lower air pressure than the exit side in a moving airflow path thus introducing an additional airflow. In this way, the integrated airflow inducer 500 in configured in a shape of a partial cone that defines a skirt disposed as a differential sized ring with a larger entrance and a smaller exit.

Figure 6:
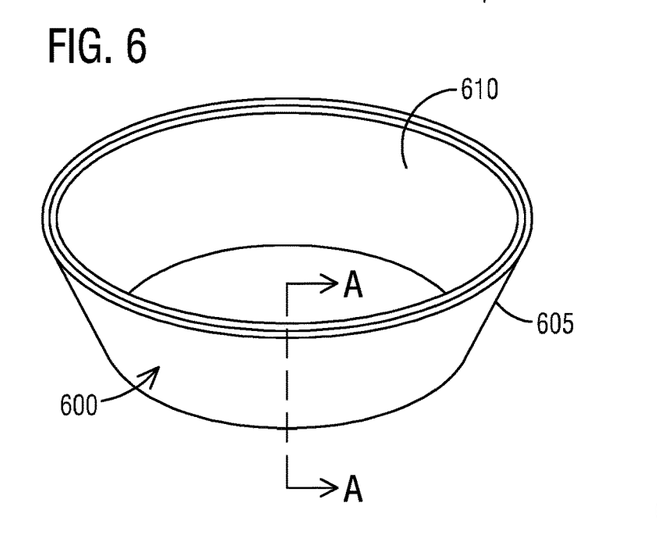
FIG. 6 illustrates a perspective view of an integrated airflow inducer in accordance with an exemplary embodiment of the present invention.

As shown in FIG. 6, it illustrates a perspective view of an integrated airflow inducer 600 in accordance with an exemplary embodiment of the present invention. The integrated airflow inducer 600 comprises a metal layer, a plastic layer and/or a composite material layer. In this embodiment, the integrated airflow inducer 600 comprises a metal layer 605 and a coating 610 on its inside surface which faces a scavenge air airflow in operation when the integrated airflow inducer 600 is mounted to a frame and a fan housing of an electric machine. The coating 610 may be selected to provide an aid in an additional air flow induced by the integrated airflow inducer 600. Characteristics of the coating 610 may be such that in increases the additional air flow caused by the presence of the integrated airflow inducer 600 on an outer edge of the frame and the fan housing. Examples of the coating 610 include a layer of a suitable material that enhances airflow because of its physical characteristics. Likewise, suitable finishes may be provided for the coating 610.

Figure 7:
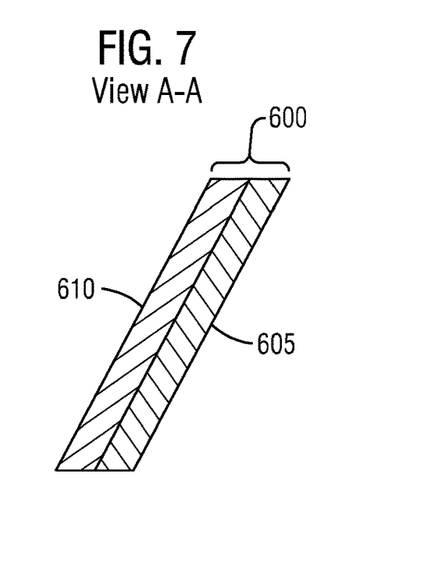
FIG. 7 illustrates a cross-sectional view of the integrated airflow inducer at a line A-A' in FIG. 6 in accordance with an exemplary embodiment of the present invention.

In FIG. 7, it illustrates a cross-sectional view of the integrated airflow inducer 600 at a line A-A' in FIG. 6 in accordance with an exemplary embodiment of the present invention. A coating layer 700 may be formed via a chemical deposition method or any other technique suitable to apply the coating layer 700 to a metal sheet 705. The metal sheet 705 may be made of a stainless steel or any hard metal capable of forming a partial cone that assists in enhancing a flow of air going down along cooling fins of a frame of an electric machine. The metal sheet 705 may have a suitable thickness to be able to perform in any environment. Instead of a metal material, the integrated airflow inducer 600 may be formed of a plastic sheet or a composite material sheet or a combination thereof with a metal.

Figure 8:
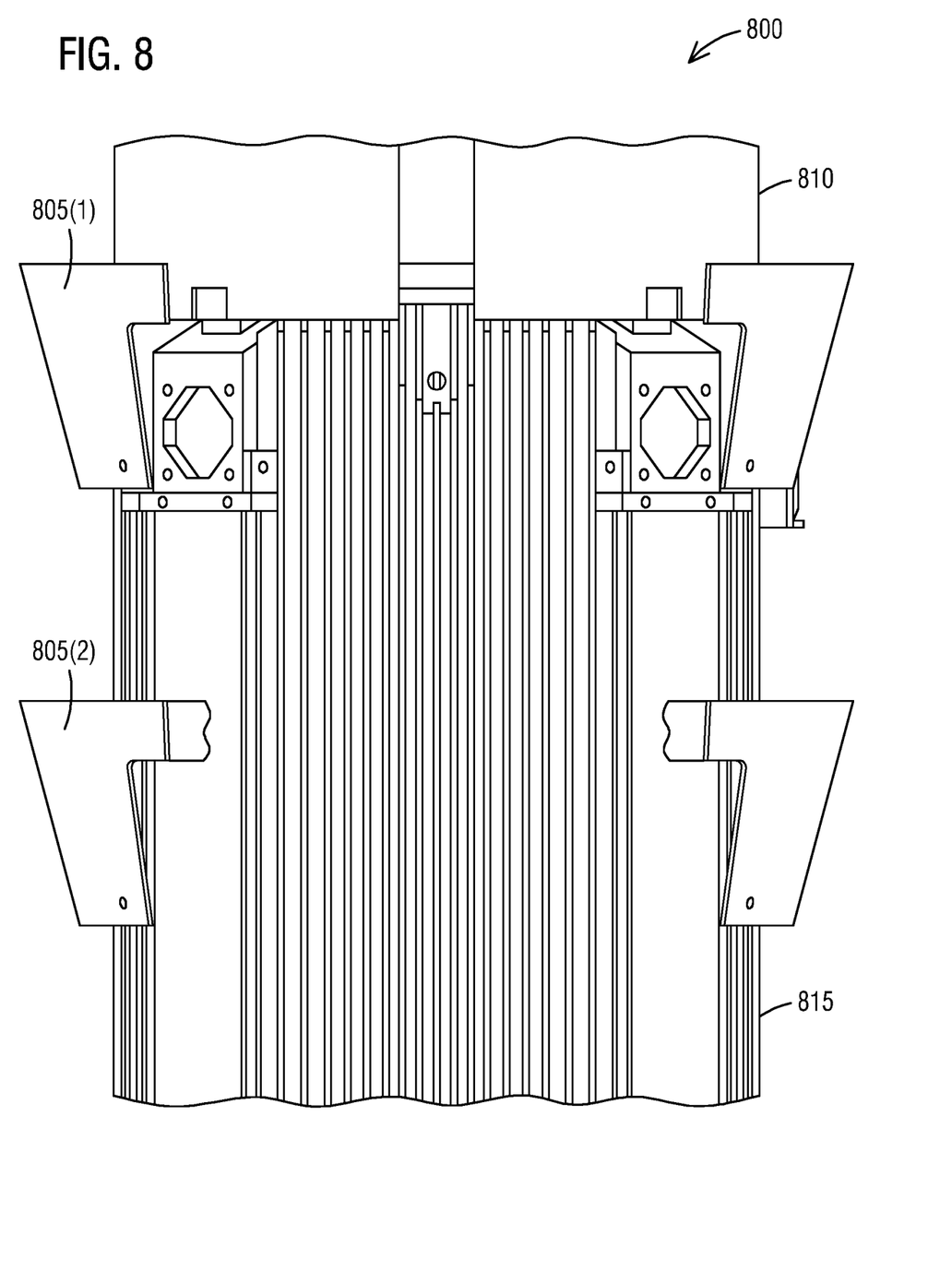
FIG. 8 illustrates a first and a second integrated airflow inducer configured to induce an additional airflow to reduce a functioning temperature of an electric machine in accordance with an exemplary embodiment of the present invention.

With regard to FIG. 8, it illustrates a combination of a first integrated airflow inducer 805(1) and a second integrated airflow inducer 805(2) configured to induce an additional airflow to reduce a functioning temperature of an electric machine 800 in accordance with an exemplary embodiment of the present invention. The electric machine 800 includes a fan housing 810 and a frame 815 as described above.

While an electric machine in a vertical configuration is described here a range of other constructions of electric machine are also contemplated by the present invention. For example, other types of motors, generators may be implemented based on one or more features presented above without deviating from the spirit of the present invention.

The techniques described herein can be particularly useful for an integrated airflow inducer as a partial cone that defines a skirt disposed as a differential sized ring with a larger entrance and a smaller exit around a frame of an electric machine at a boundary between the frame and a fan housing including a rotating fan to cool the electric machine. While particular embodiments are described in terms of such an integrated airflow inducer configuration, the techniques described herein are not limited to the partial cone but can also be used with other suitable layouts.

The described airflow inducer is a simple and inexpensive way to increase airflow and reduce the operating temperature of rotating electric machines, for example induction motors. The integrated flow inducer will aid in the pursuit increasing power ratings of existing machine sizes. The integrated airflow inducer may be used in connection with electric motors, generators, turbines, and many other rotating machines.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. An electric machine comprising:
   a frame that defines a housing of the electric machine, wherein the frame includes a top edge and a plurality of cooling fins along a length of the housing;
   a cooling fan disposed in a fan housing, the fan housing includes a bottom edge, wherein the fan housing is mounted on the top edge of the frame such that a fan cavity is formed between the bottom edge of the fan housing and the plurality of cooling fins of the frame;
   an integrated airflow inducer in a shape of a partial cone that defines a skirt disposed as a ring around the frame at a boundary between the frame and the fan housing, wherein the integrated airflow inducer including an inducer inlet and an inducer outlet, and wherein the integrated airflow inducer is configured to increase an airflow across the frame of the electric machine so that the electric machine operates at a lower temperature than without the integrated airflow inducer; and
   a second integrated airflow inducer configured to induce an additional airflow to reduce a functioning temperature of the electric machine, wherein the integrated airflow inducer is in the shape of the partial cone that defines the skirt disposed as the ring around a moving airflow path, and wherein the ring has a larger diameter on an entrance side for a scavenge air to enter and a smaller diameter on an exit side such that the entrance side has a lower air pressure than the exit side in the moving airflow path thus introducing the additional airflow.

2. The electric machine of claim 1, wherein the integrated airflow inducer utilizes a high velocity and a dynamic pressure of an air exiting the fan cavity to create a negative pressure at the inducer inlet for causing the air to be drawn into the integrated airflow inducer and guided toward the plurality of cooling fins of the frame, thus increasing heat rejection capabilities of the frame.

3. The electric machine of claim 2, wherein the integrated airflow inducer is arranged such that due to an air pressure that is created by the cooling fan, the housing of the electric machine is at a higher pressure than an atmospheric pressure causing an ambient air being drawn into the inducer inlet and guided toward the plurality of cooling fins of the frame.

4. The electric machine of claim 1, wherein the integrated airflow inducer comprises at least one of a metal, a plastic and a composite material.

5. The electric machine of claim 1, wherein the integrated airflow inducer comprises the shape of the partial cone with straight surfaces such that the ring is in a form of an arc.

6. The electric machine of claim 5, wherein the integrated airflow inducer comprises a length of the arc that is tuned to optimize performance such that the length of the arc and an angle of the straight surfaces of the partial cone are to be modified to optimize performance.

7. The electric machine of claim 1, wherein an airflow is created by rotating the cooling fan within the fan housing to create an air pressure differential wherein while the cooling fan requires a power source for movement the integrated airflow inducer is passive and doesn't require an additional power.

8. The electric machine of claim 1, wherein the cooling fan develops a higher pressure at the inducer outlet than the inducer inlet of the integrated airflow inducer so that the integrated airflow inducer takes advantage of the high pressure to draw in air from a low pressure at the inducer inlet.

9. The electric machine of claim 1, wherein the integrated airflow inducer in the shape of the partial cone that defines the skirt disposed as a differential sized ring with a larger entrance and a smaller exit.

10. A method comprising:
providing a frame that defines a housing of an electric machine, wherein the frame includes a top edge and a plurality of cooling fins along a length of the housing;
providing a cooling fan disposed in a fan housing, the fan housing includes a bottom edge, wherein the fan housing is mounted on the top edge of the frame such that a fan cavity is formed between the bottom edge of the fan housing and the plurality of cooling fins of the frame;
providing an integrated airflow inducer in a shape of a partial cone that defines a skirt disposed as a ring around the frame at a boundary between the frame and the fan housing, wherein the integrated airflow inducer including an inducer inlet and an inducer outlet, and wherein the integrated airflow inducer is configured to increase an airflow across the frame of the electric machine so that the electric machine operates at a lower temperature than without the integrated airflow inducer; and
providing a second integrated airflow inducer configured to induce an additional airflow to reduce a functioning temperature of the electric machine, wherein the integrated airflow inducer is in the shape of the partial cone that defines the skirt disposed as the ring around a moving airflow path, and wherein the ring has a larger diameter on an entrance side for a scavenge air to enter and a smaller diameter on an exit side such that the entrance side has a lower air pressure than the exit side in the moving airflow path thus introducing the additional airflow.

11. The method of claim 10, wherein the integrated airflow inducer utilizes a high velocity and a dynamic pressure of an air exiting the fan cavity to create a negative pressure at the inducer inlet for causing the air to be drawn into the integrated airflow inducer and guided toward the plurality of cooling fins of the frame, thus increasing heat rejection capabilities of the frame.

12. The method of claim 11, wherein the integrated airflow inducer is arranged such that due to an air pressure that is created by the cooling fan, the housing of the electric machine is at a higher pressure than an atmospheric pressure causing an ambient air being drawn into the inducer inlet and guided toward the plurality of cooling fins of the frame.

13. The method of claim 10, wherein the integrated airflow inducer comprises at least one of a metal, a plastic and a composite material.

14. The method of claim 10, wherein the integrated airflow inducer comprises the shape of the partial cone with straight surfaces such that the ring is in a form of an arc.

15. The method of claim 14, wherein the integrated airflow inducer comprises a length of the arc that is tuned to optimize performance such that the length of the arc and an angle of the straight surfaces of the partial cone are to be modified to optimize performance.

16. The method of claim 10, wherein an airflow is created by rotating the cooling fan within the fan housing to create an air pressure differential wherein while the cooling fan requires a power source for movement the integrated airflow inducer is passive and doesn't require an additional power.

17. The method of claim 10, wherein the cooling fan develops a higher pressure at the inducer outlet than the inducer inlet of the integrated airflow inducer so that the integrated airflow inducer takes advantage of the high pressure to draw in air from a low pressure at the inducer inlet.

18. The method of claim 10, wherein the integrated airflow inducer in the shape of the partial cone that defines the skirt disposed as a differential sized ring with a larger entrance and a smaller exit.

* * * * *